United States Patent [19]

van Laar

[11] Patent Number: 5,314,054
[45] Date of Patent: May 24, 1994

[54] BUFFER APPARATUS AND DRIVING SYSTEM

[75] Inventor: Gerardus J. C. van Laar, Scherpenzeel, Netherlands

[73] Assignee: EBM Techniek B.V., Scherpenzeel, Netherlands

[21] Appl. No.: 868,026

[22] Filed: Apr. 13, 1992

[30] Foreign Application Priority Data

Apr. 15, 1991 [NL] Netherlands .................... 9100655

[51] Int. Cl.$^5$ ............................................ B65G 1/133
[52] U.S. Cl. .................... 198/347.1; 198/430; 198/816; 198/733; 198/484.1
[58] Field of Search ............... 198/728, 733, 841, 816, 198/813, 430, 429, 484.1, 347.1

[56] References Cited

U.S. PATENT DOCUMENTS

| | | | |
|---|---|---|---|
| 3,198,316 | 8/1965 | Bivans | 198/728 X |
| 3,298,499 | 1/1967 | Ellis et al. | 198/733 |
| 3,358,810 | 12/1967 | Zauner | 198/733 |
| 4,019,624 | 4/1977 | Torres | 198/728 X |
| 4,768,642 | 9/1988 | Hunter | 198/484.1 X |
| 4,801,003 | 1/1989 | Costa | 198/728 X |
| 5,033,158 | 7/1991 | Petho | 198/484.1 X |
| 5,143,199 | 9/1992 | Evans | 198/484.1 X |

FOREIGN PATENT DOCUMENTS

| | | |
|---|---|---|
| 3724839 | 2/1989 | Fed. Rep. of Germany . |
| 6505038 | 10/1965 | Netherlands . |
| 1195056 | 6/1970 | United Kingdom . |

Primary Examiner—D. Glenn Dayoan
Attorney, Agent, or Firm—Webb, Burden, Ziesenheim & Webb

[57] ABSTRACT

An apparatus for buffering or temporarily storing articles is disclosed. The apparatus includes a feed for the articles with at least one endless flexible member moving past the feed. Doglike elements which engage the articles and between which the articles are transported are movable together with the flexible member. One or more guide members for guiding the flexible member during changes of direction are provided with a discharge for discharging an article from between two doglike elements. A mechanism for diminishing the impact to the articles is provided wherein the guide members are movable relative to the feed and/or discharge.

15 Claims, 9 Drawing Sheets

BUFFER APPARATUS AND DRIVING SYSTEM

BACKGROUND OF THE INVENTION

Buffer or collating apparatus arranged in packaging lines for example for bars of chocolate and the like are known—see for example the German patent application 3724839—and have the object of discharging with regular mutual spacing articles that are supplied with at least slightly irregular mutual spacing.

In the known buffer apparatus problems occur particularly in respect of damage to these articles by sudden changes in movement of dogs and/or impacts against such dogs.

The present invention has for its object to improve the known buffer apparatus and/or obviate the above stated problems.

SUMMARY OF THE INVENTION

To this end the present invention provides an apparatus for buffering or temporarily storing articles, comprising:
- a feed for the articles;
- at least one endless flexible member movable past the feed;
- doglike elements which engage the articles and between which the articles are transported, and which elements are movable together with the flexible member;
- one or more guide members for guiding the flexible member during changes of direction;
- a discharge for discharging an article from between two doglike elements; and
- means for diminishing impact to the articles, wherein the guide members are movable relative to feed and/or discharge.

A further aspect of the present invention provides for a system for converting a rotating movement into a stepwise linear movement, comprising:
- an electrical motor for generating the rotating movement;
- a drive member for stepwise driving of the electrical motor, wherein the electric motor is driven by the drive member such that the beginning and end of the linear movement is obtained that is as impact free as possible. Preferably in such system the electrical motor is driven according to the formula $s(t) = at + b \sin(\omega t + \phi)$, wherein $s(t)$ is the path covered in the transporting direction as a function of the time t, and a, b, $\omega$ and $\phi$ are constants.

When a buffer apparatus according to the present invention is driven by this preferred system, damage to articles, such as bars of chocolate is diminished to a minimum, as the force is reduced to approximately zero at the beginning and end of the linear movement.

BRIEF DESCRIPTION OF THE DRAWING

Further advantages, features and details of the present invention will become apparent in the light of the description of preferred embodiments thereof with reference to the annexed drawings, wherein.

DESCRIPTION OF THE PREFERRED EMBODIMENTS

Figure 1:
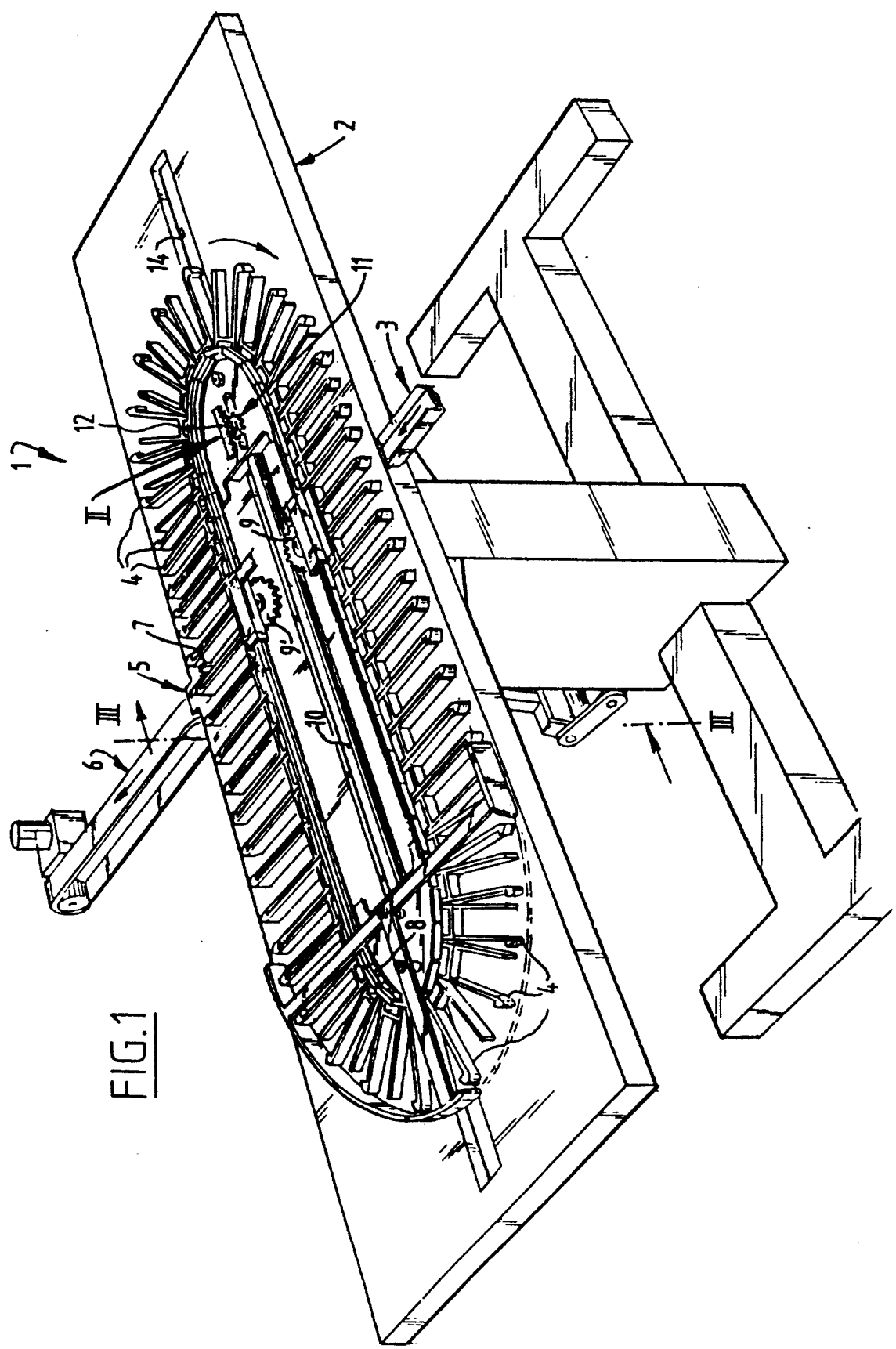
FIG. 1 is a view in perspective of a first embodiment of the buffer device according to the present invention.

A buffer apparatus 1 (FIG. 1) according to the present invention comprises a table 2 with a feed 3 for articles (not further shown) which are placed between carriers or doglike elements 4. Arranged opposite the feed 3 is a discharge 5 onto which connects a discharge conveyor 6 for carrying away articles from the intermediate spaces between the carriers 4. Only partially visible in FIG. 1 is a press-out member 7 which forms part of transfer means for transferring articles from the apparatus 1 to the discharge conveyor 6. The carriers 4 are fixed to the flexible member or chain 8 which is endless and on which engage tooth wheels of two motors 9, 9'. The chain 8 is held at tension by a tensioning member 10 of which adjusting means 11 form part (see also FIG. 2), so that using a gear rack 12 and a screw bolt 13 thereof the desired tension on the chain can be obtained.

The chain provided with the carriers is slidable in a slot 14 by means of the motors 9, 9' so that the discharge of products can take place independently within determined limits using the discharge conveyor, while the feed thereof varies within determined limits.

Figure 2:
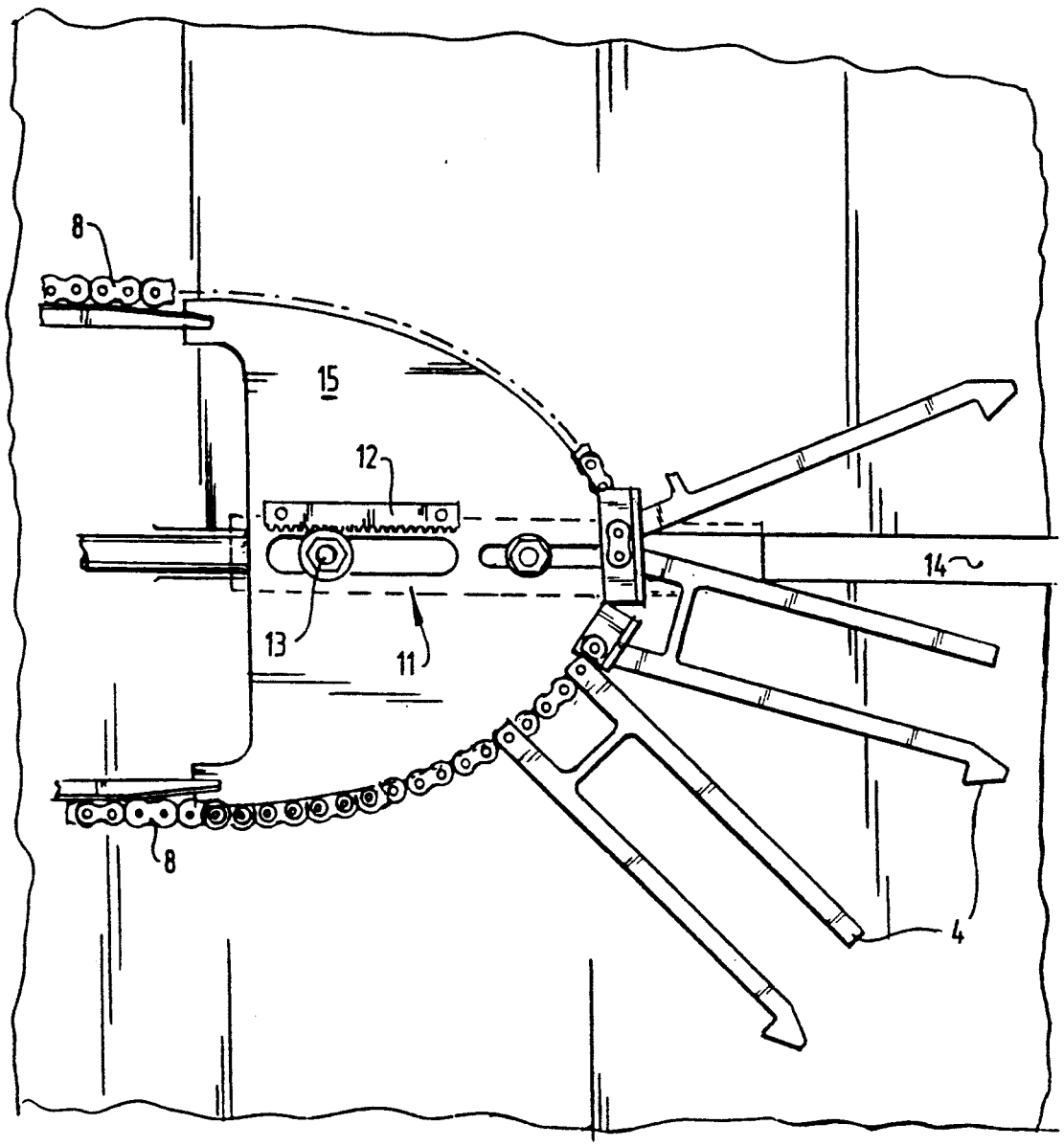
FIG. 2 is a top view of detail II in FIG. 1.

Particularly in FIG. 2 can be seen that a guide member 15 provides a gradual transition between a straight movement of chain 8 and an opposing direction of chain 8. In this shown preferred embodiment this guide member has an approximately elliptical shape, whereby particularly at the start of the movement diverging from straight there are no shocks or impacts on the articles (not shown) between the carriers 4. These carriers 4 are preferably embodied in plastic material so that the articles are damaged as little as possible.

The press-out member 7 (FIG. 3, 4, 5) forms part of transfer means 20 for transferring the articles to the discharge conveyor 6. The schematically depicted transfer mechanism 21 is coupled in a manner not shown, via for instance curve discs and the like, to the motor for tooth wheel 9' and enables a movement along the curve designated with a dash-dot line via two cranks 22, 23, wherewith the articles can be pressed out, as will be apparent from FIG. 3, 4 and 5, while the return movement of press-out member 7 takes place along the underside of the table-top.

The above described and shown embodiment has the following advantages:
- the driving of the flexible member or chain 8 requires comparatively little power as it takes place directly;
- the chain is situated at a higher level than the top of the table along which the products are transported, whereby this chain is easily accessible for maintenance and the like;

owing to the transfer means 20 a good transfer to the discharge conveyor 6 is obtained.

A second embodiment 61 (FIG. 6) of a buffer apparatus according to the present invention is provided with a mechanism 60 for driving a chain 8' under a table 62 and makes use of a flexible member or drive belt 63 which, using intermediate wheels 64, 65, is coupled to a motor 66 and via intermediate wheels 67, 68 to a motor 69. By means of the strip or belt 63 wheels 70 and 71 are driven which are coupled to the tooth wheels 72 and 73 respectively along which the chain 8' is guided.

Figure 7:
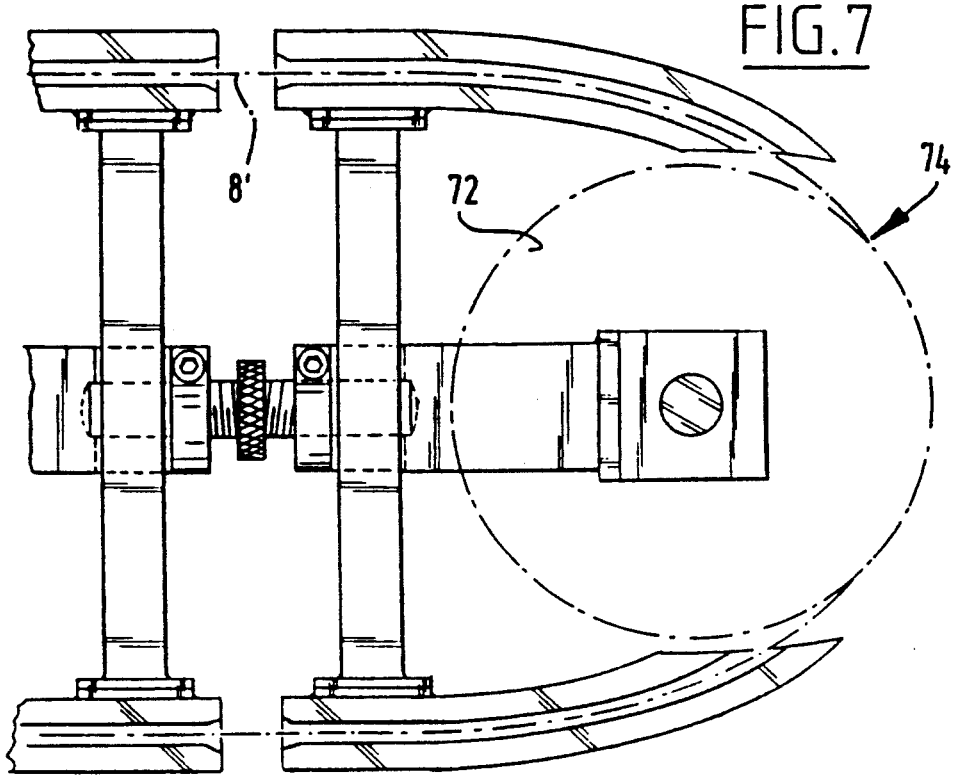
FIG. 7 is a top view of detail VII in FIG. 6.

It can be seen particularly in FIG. 7 that guide member 74 of which the respective wheels 72 and 73 form part is approximately ellipse-shaped.

Figure 6:
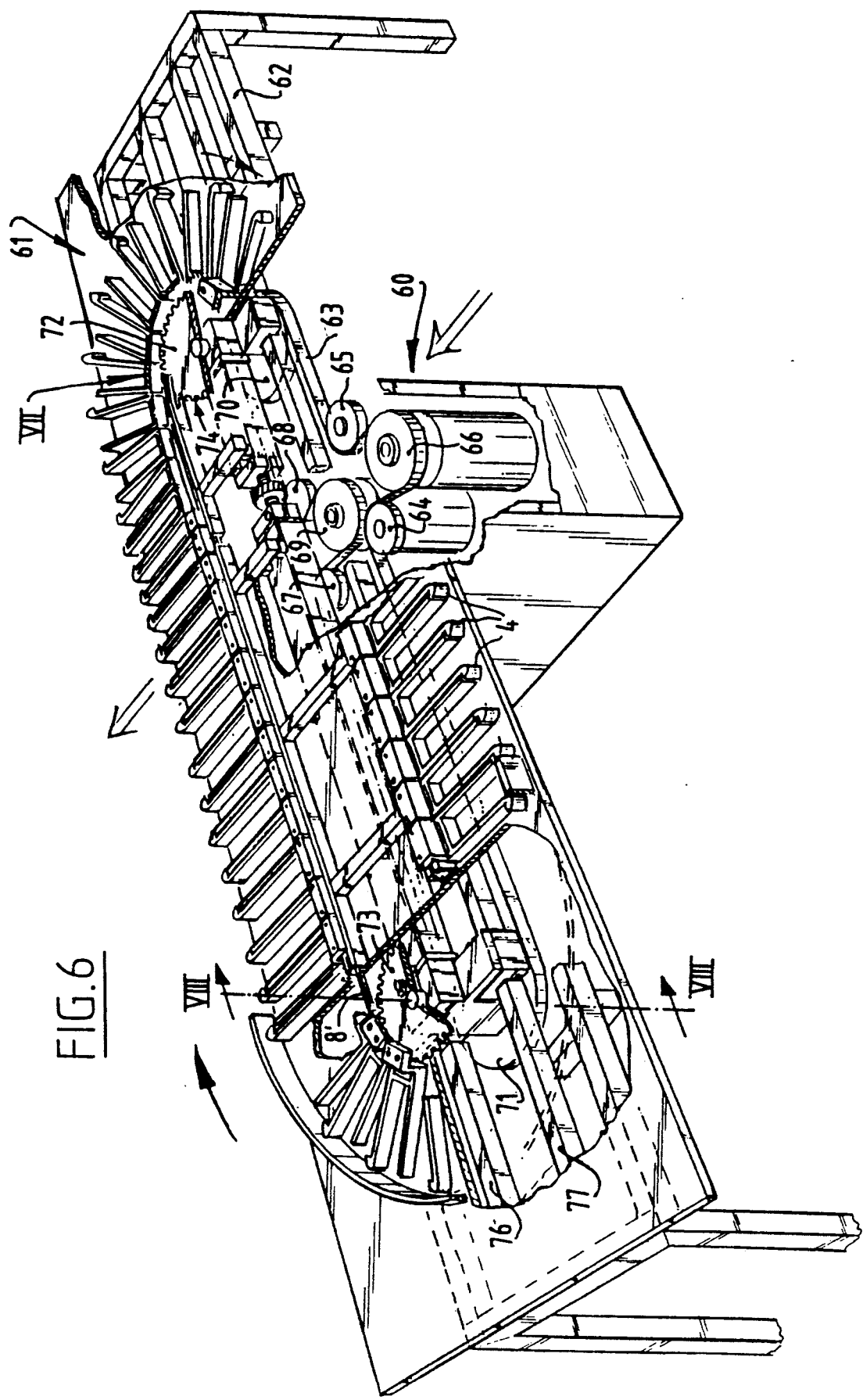
FIG. 6 shows a second embodiment of a buffer device according to the present invention.

Tooth wheel 73 and wheel 71 (FIG. 8) are mutually coupled via shaft 75 while, as can also be seen in FIG. 6, the whole can slide over rails 76, 77 in order to enable feed and discharge of products to and from the buffer device to be carried out independently.

Figure 8:
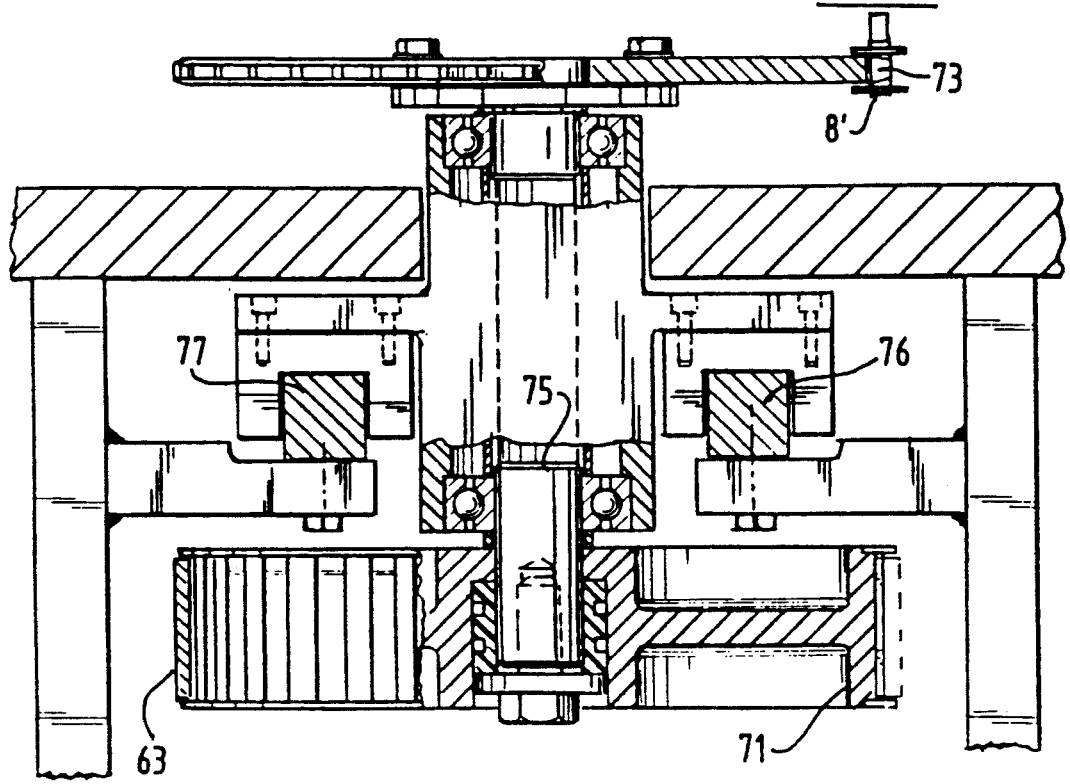
FIG. 8 shows a section along the broken line VIII—VIII in FIG. 6.

The embodiment shown in FIG. 6, 7 and 8 and described above has the further advantage that the indirect driving of the chain 8' prevents wear thereof or at least causes it to be reduced to a considerable degree.

Figure 3:
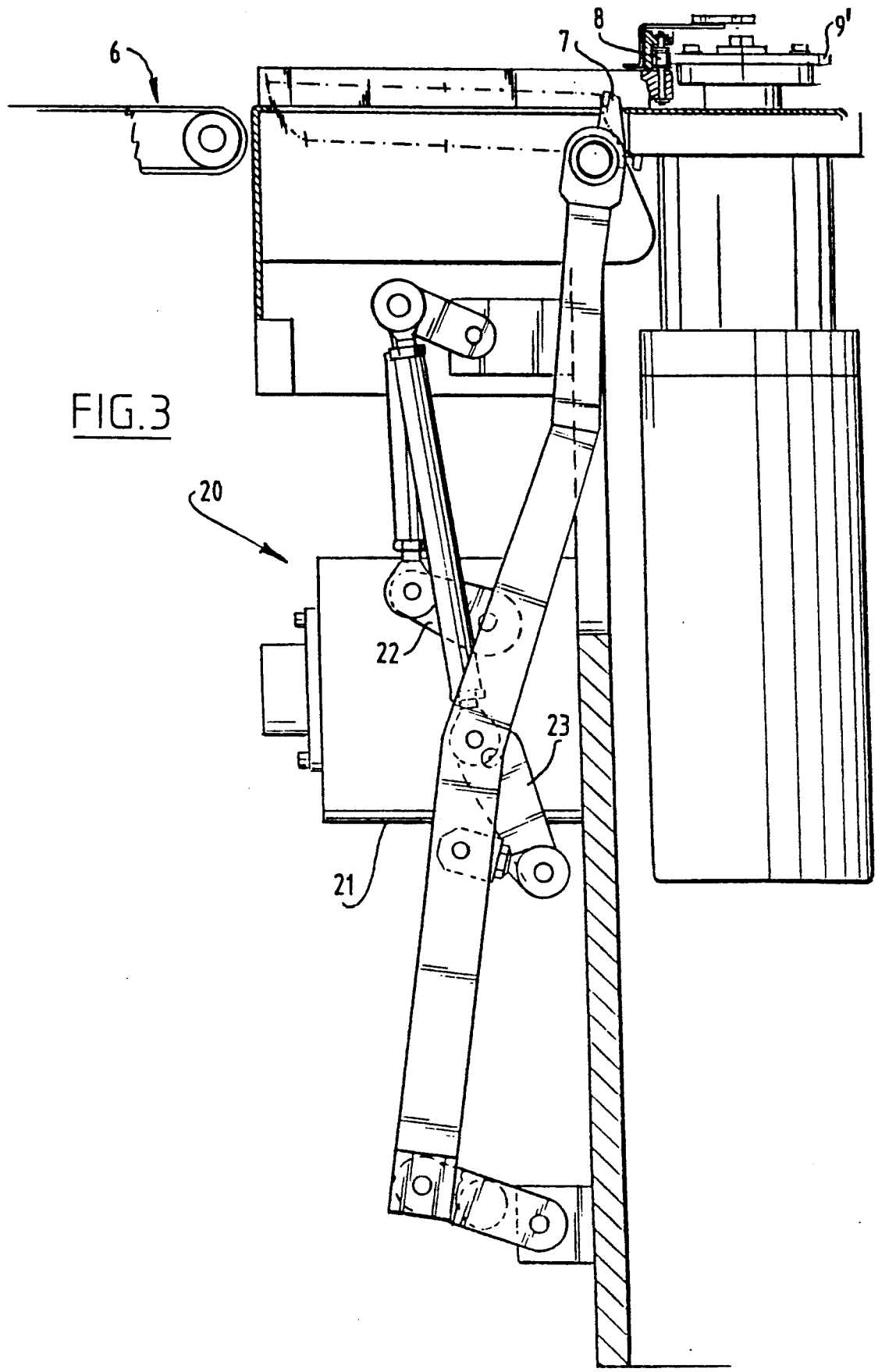
FIG. 3 shows a side view of detail III of the buffer device of FIG. 1 that is only very partially visible in FIG. 1, in a first operational position.
Figure 4:
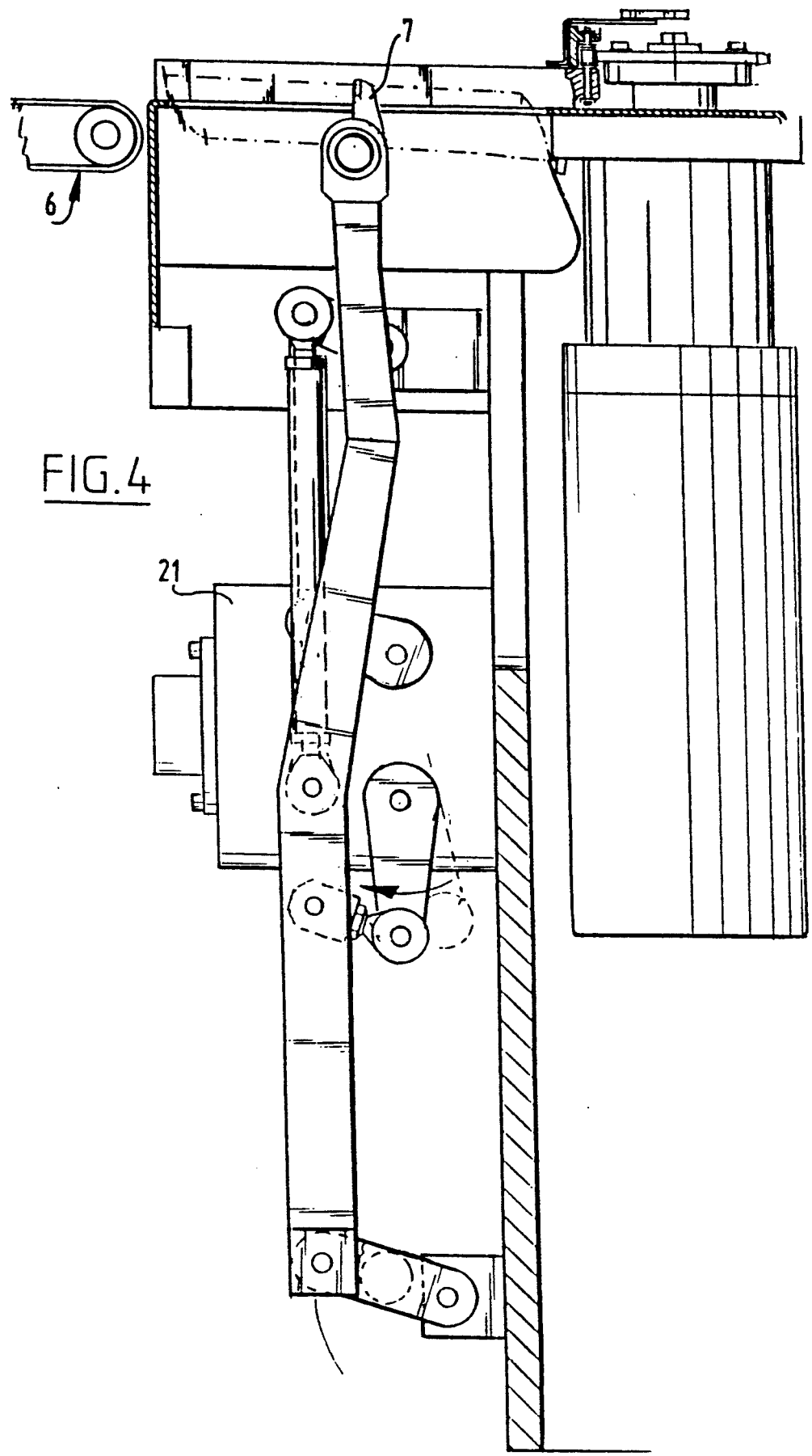
FIG. 4 shows the detail of FIG. 3 in a second position.
Figure 5:
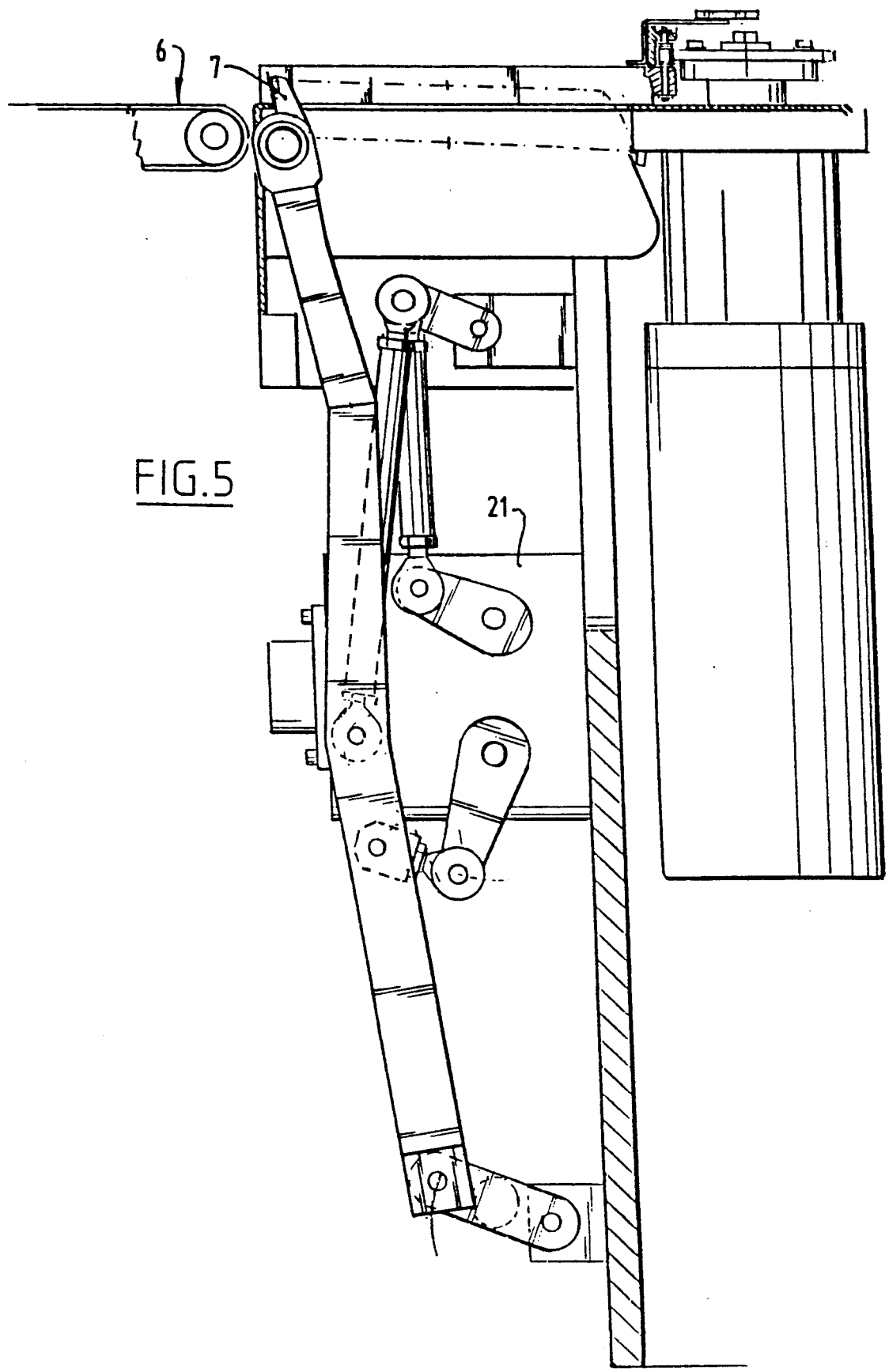
FIG. 5 shows the detail of FIG. 3 in a third position.
Figure 10:
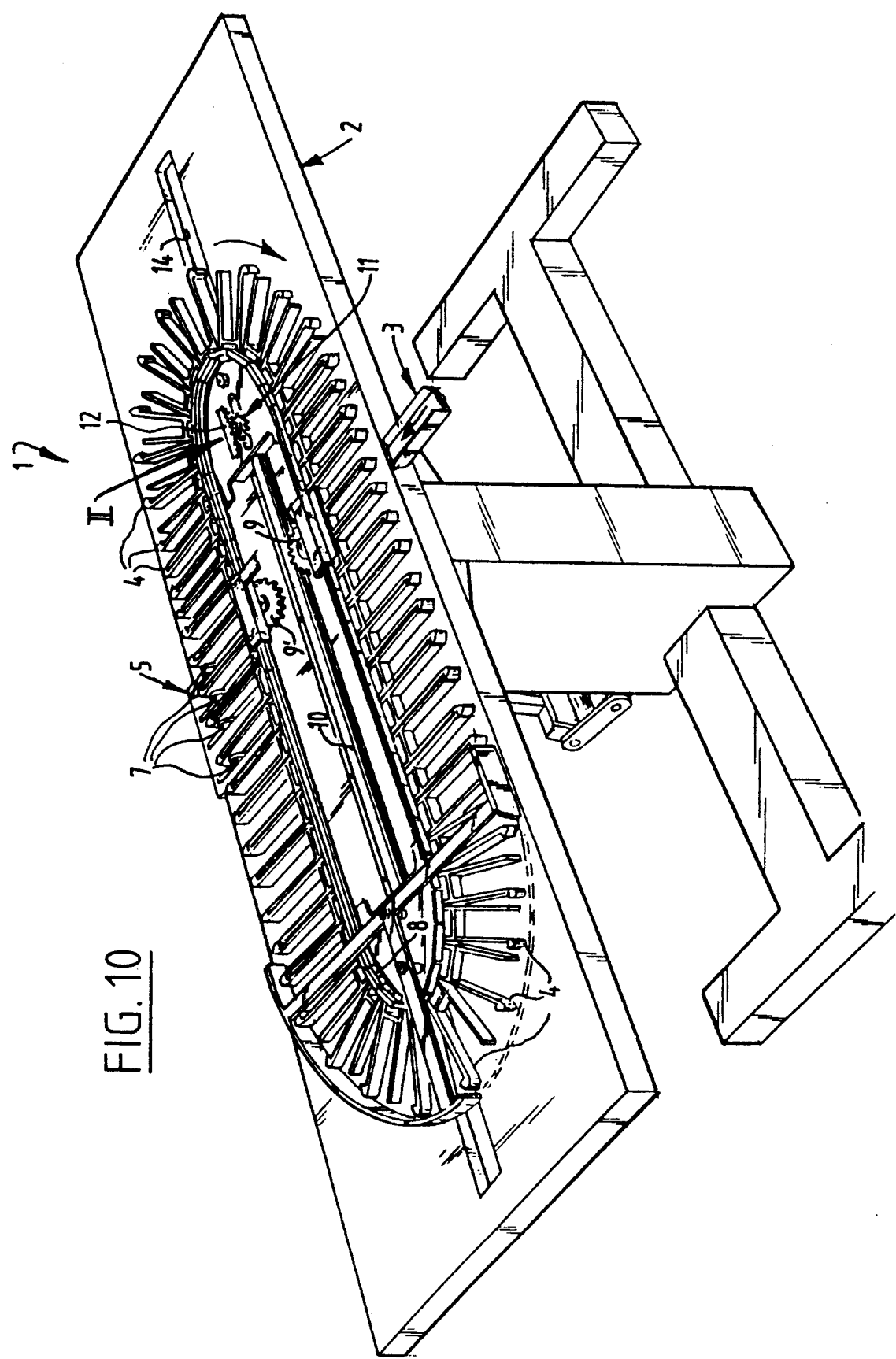
FIG. 10 is a view in perspective of a modified version of the first embodiment of the buffer device according to the present invention.

Preferably a number of press out members according to FIG. 3, 4 and 5, are disposed side by side such that as soon as such number of articles is available near the discharge of the buffer apparatus, as shown in FIG. 10, the flexible member is moved over a suitable distance, whereafter such number of articles is discharged or ejected at the same time by all of the press out members, e.g. for bringing the article side by side into a packaging box.

Figure 9:
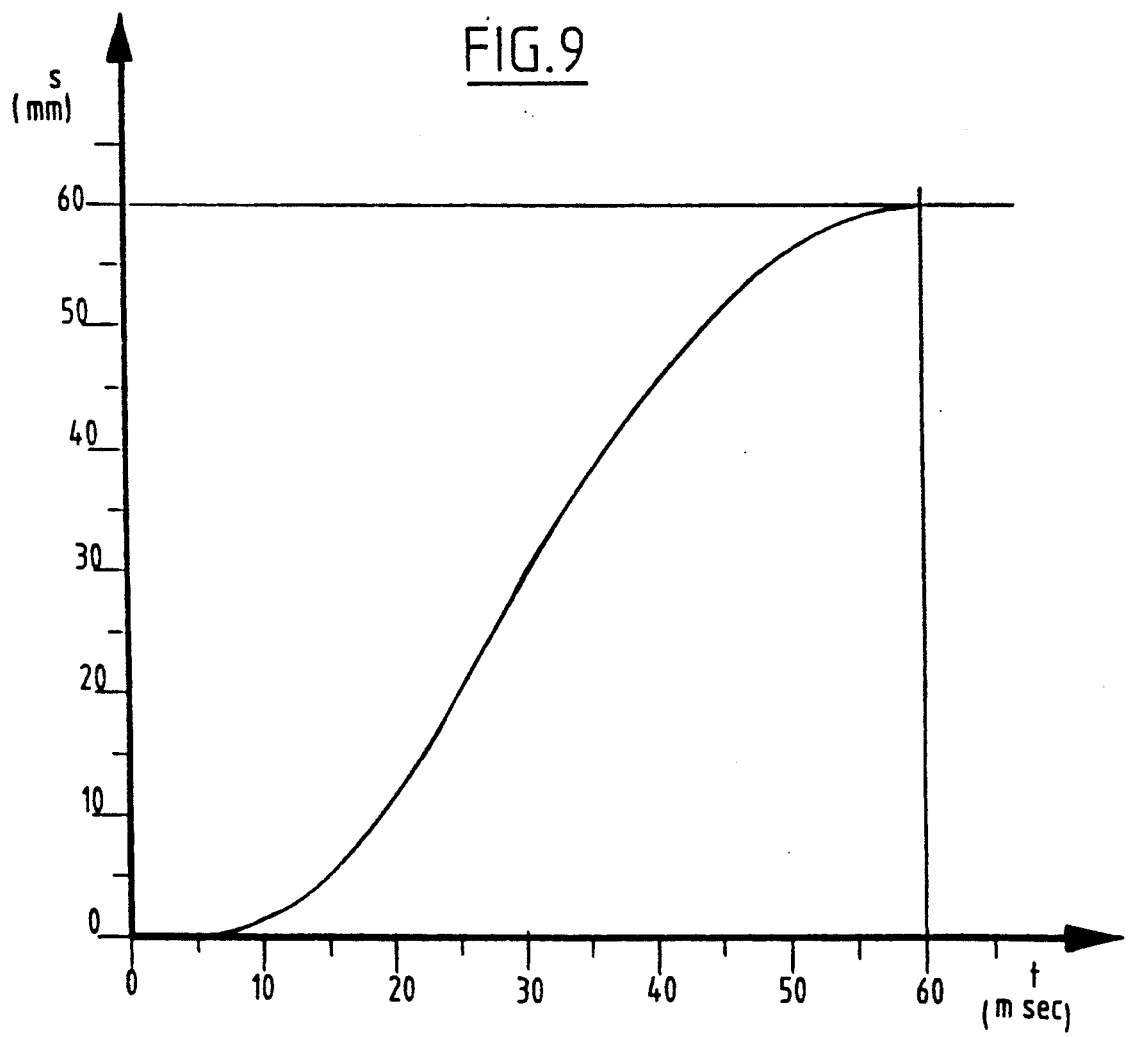
FIG. 9 a graph of a function s(t) as function of the time t, according to a preferred embodiment of the present invention.

Preferably the path for the articles is defined by $s(t) = a + b \sin(\omega t + \phi)$. FIG. 9 in a graph from an embodiment wherein the article covers a distance of 60 mm in a time period of 60 ms, preventing impact at the beginning and end of the linear movement, as the force exerted to the article is minimized.

Preferably a term is added to the above formula for compensating for friction between the articles and the table, the value of which friction can be very dependent on the articles and the smoothness of the surface or table.

In practical embodiment (not shown) the curve of FIG. 9 is sampled and the sampled values are stored into a memory of a drive system for an electrical motor.

I claim:

1. An apparatus for buffering or temporarily storing articles, comprising:
    a feed for the articles;
    at least one endless flexible member movable past the feed;
    doglike elements which engage the articles and between which the articles are transported, and which elements are movable together with the flexible member;
    one or more guide members for guiding the flexible member during changes of direction;
    a discharge for discharging an article from between two doglike elements; and
    means for diminishing impact to the articles, wherein the guide members are movable relative to feed and/or discharge, wherein the impact diminishing means includes a drive member for an electric motor, whereby beginning and end of the linear movement is substantially impact free, wherein the electric motor is driven according to the formula $s(t) = at + b \sin(\omega t + \phi)$, wherein $s(t)$ is the path covered in the transporting direction as a function of time t, and a, b, $\omega$ and $\phi$ are constants.

2. An apparatus according to claim 1, wherein an extra constant is added to said formula, such as to compensate for friction of the surface on which the articles are moved.

3. A buffer apparatus as claimed in claim 1, wherein means for transferring an article to outside the buffer device are provided close to the discharge, wherein the transfer means are coupled to the movable flexible member.

4. A buffer apparatus as claimed in claim 1, wherein the flexible member is a chain and wherein the doglike elements are arranged at a lower level than the chain.

5. A buffer apparatus as claimed in claim 1, wherein the doglike elements are embodied in flexible plastic material.

6. A buffer apparatus as claimed in claim 1, provided with a second flexible member which is trained about first wheels which are coupled to second wheels forming part of the guide members.

7. A buffer apparatus as claimed in claim 6, wherein a set of wheels for the first and second flexible member is mounted along rails.

8. A buffer apparatus as claimed in claim 1, wherein a number of transferring elements are adjacently disposed, such that an equivalent number of articles can be discharged at approximately the same moment in time.

9. A buffer apparatus as claimed in claim 2, wherein means for transferring an article to outside the buffer device are provided close to the discharge, wherein the transfer means are coupled to the movable flexible member.

10. A buffer apparatus as claimed in claim 1, wherein the flexible member is a chain and wherein the doglike elements are arranged at a lower level than the chain.

11. A buffer apparatus as claimed in claim 1, wherein the doglike elements are embodied in flexible plastic material.

12. A buffer apparatus as claimed in claim 2, wherein a number of transferring elements are adjacently disposed, such that an equivalent number of articles can be discharged at approximately the same moment in time.

13. A buffer apparatus as claimed in claim 1, wherein means for transferring an article to outside the buffer apparatus are provided close to the discharge, wherein the transfer means are coupled to the movable flexible member.

14. A buffer apparatus as claimed in claim 1, wherein a number of transferring elements are adjacently disposed, such that an equivalent number of articles can be discharged at approximately the same moment in time.

15. A buffer apparatus as claimed in claim 7, wherein a number of transferring elements are adjacently disposed, such that an equivalent number of articles can be discharged at approximately the same moment in time.

* * * * *